(12) United States Patent
Klapman

(10) Patent No.: US 11,782,621 B2
(45) Date of Patent: Oct. 10, 2023

(54) LOCK OR UNLOCK INDICATOR ON A DATA STORAGE DEVICE

(71) Applicant: Western Digital Technologies, Inc., San Jose, CA (US)

(72) Inventor: Matthew Harris Klapman, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 132 days.

(21) Appl. No.: 17/362,992

(22) Filed: Jun. 30, 2021

(65) Prior Publication Data

US 2023/0004290 A1   Jan. 5, 2023

(51) Int. Cl.
*G06F 3/06*    (2006.01)
*G06F 21/62*   (2013.01)

(52) U.S. Cl.
CPC ............ *G06F 3/064* (2013.01); *G06F 3/0625* (2013.01); *G06F 3/0674* (2013.01); *G06F 21/6209* (2013.01)

(58) Field of Classification Search
CPC ...... G06F 3/064; G06F 3/0625; G06F 3/0674; G06F 21/6209
See application file for complete search history.

(56) References Cited

U.S. PATENT DOCUMENTS

| 11,386,023 B1 * | 7/2022 | Tarikere | G06F 13/1668 |
| 2003/0140228 A1 * | 7/2003 | Binder | G06Q 20/346 |
| | | | 713/172 |
| 2006/0143454 A1 * | 6/2006 | Walmsley | G06F 21/85 |
| | | | 713/170 |
| 2007/0112981 A1 | 5/2007 | Hernandez | |
| 2007/0283085 A1 * | 12/2007 | Lin | G11B 33/121 |
| | | | 711/112 |

(Continued)

FOREIGN PATENT DOCUMENTS

WO   WO-2017181175 A1 * 10/2017 ............. G06F 21/35
WO   WO-2018226265 A1 * 12/2018 ............. G06F 21/32

OTHER PUBLICATIONS

L. Daynes and G. Czajkowski, "High-performance, space-efficient, automated object locking," Proceedings 17th International Conference on Data Engineering, Heidelberg, Germany, 2001, pp. 163-172.*

(Continued)

*Primary Examiner* — Pierre Michel Bataille
(74) *Attorney, Agent, or Firm* — PATENT LAW WORKS LLP

(57) ABSTRACT

A data storage device 100 comprising: a non-volatile storage medium 108 configured to store user data 109; a data port 106 configured to transmit data and power between a host computer system 130 and the data storage device 100; a data access state indicator 140; and a controller 110 configured to: selectively set a data access state of the data storage device 100 to either: an unlocked state to enable access to the user data 109; or a locked state to disable access to the user data 109; and generate an indicator control signal to cause the data access state indicator 140 to indicate the data access state, wherein the data access state indicator 140 is configured to indicate the data access state irrespective of whether the data storage device 100 is powered through the data port 106.

20 Claims, 7 Drawing Sheets

(56) References Cited

U.S. PATENT DOCUMENTS

| | | |
|---|---|---|
| 2010/0049993 A1 | 2/2010 | Okaue et al. |
| 2012/0181333 A1 | 7/2012 | Krawczewicz et al. |
| 2015/0278125 A1 | 10/2015 | Bolotin et al. |
| 2017/0301166 A1* | 10/2017 | Earles ................. G07C 9/00309 |
| 2018/0004274 A1* | 1/2018 | Olson ................... G06F 3/0625 |
| 2020/0042215 A1* | 2/2020 | Roberts ................. G06F 3/0634 |
| 2020/0293206 A1* | 9/2020 | Isozaki ................... H04L 9/088 |
| 2021/0397917 A1 | 12/2021 | Chatterjee |
| 2022/0091602 A1* | 3/2022 | Watkins ................ G06F 1/3206 |
| 2022/0237274 A1* | 7/2022 | Paul ........................ G06F 21/32 |
| 2022/0364387 A1* | 11/2022 | Pardo ...................... E05B 17/10 |

OTHER PUBLICATIONS

International Search Report and Written Opinion for PCT/US2022/017180, dated Aug. 10, 2022, 12 pgs.

"Corsair Flash Readout series", Jan. 19, 2007, article available from https://www.digitimes.com/photogallery/showphoto.asp?ID=1782&tag=24.

Corsair Flash Padlock 2 User Manual available from https://www.corsair.com/corsairmedia/sys_master/productcontent/CorsairPadlock_UserManual_EN.pdf.

* cited by examiner

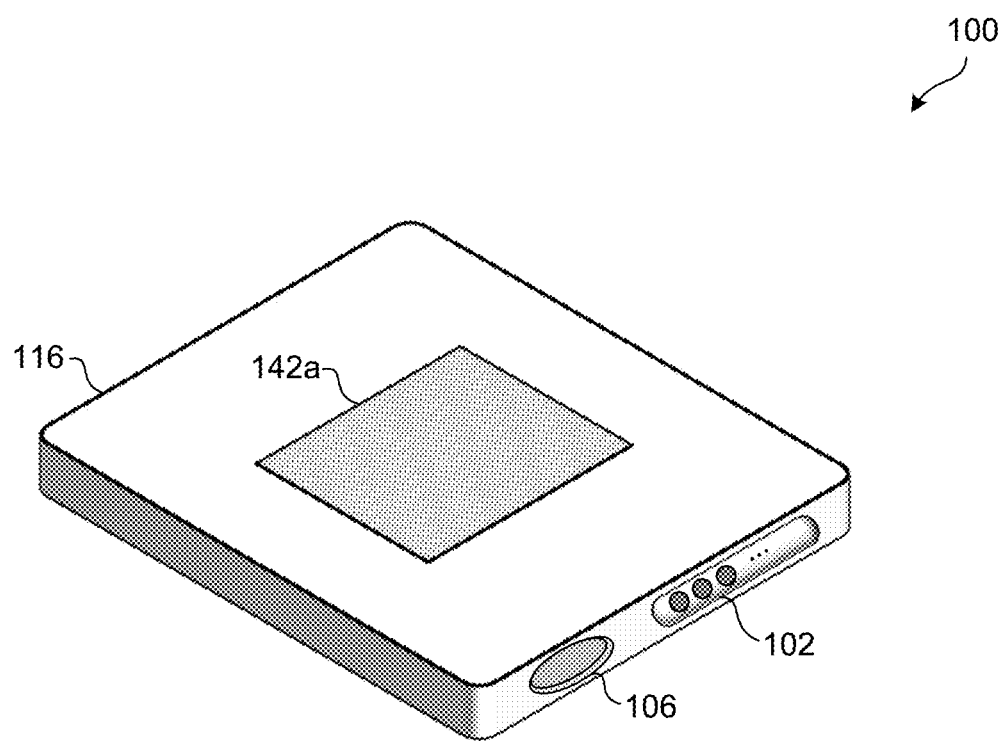
Fig. 2a
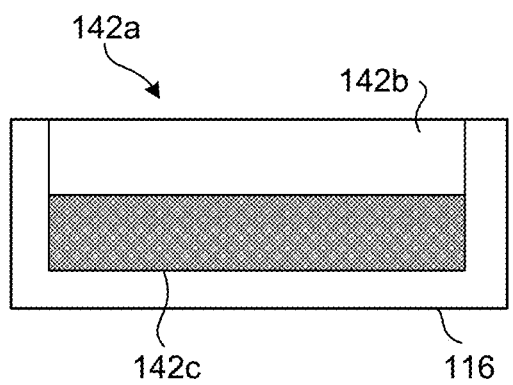 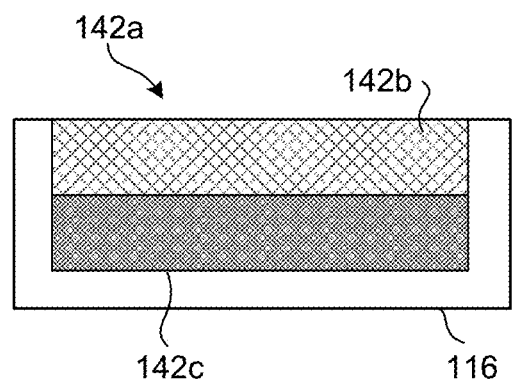
Fig. 2b       Fig. 2c

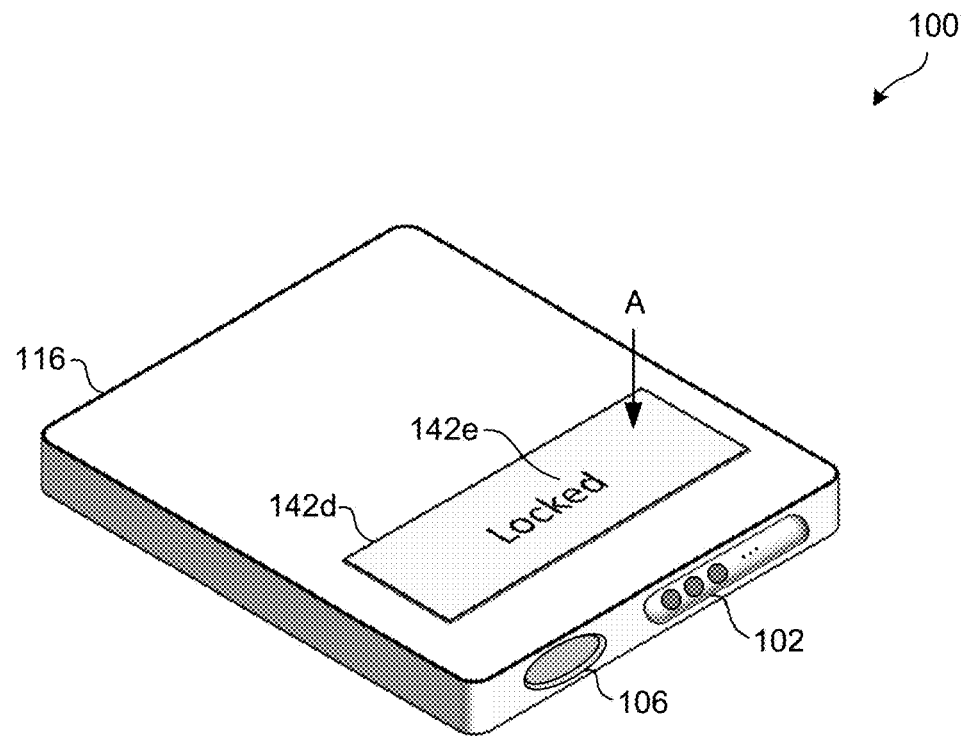
Fig. 3a
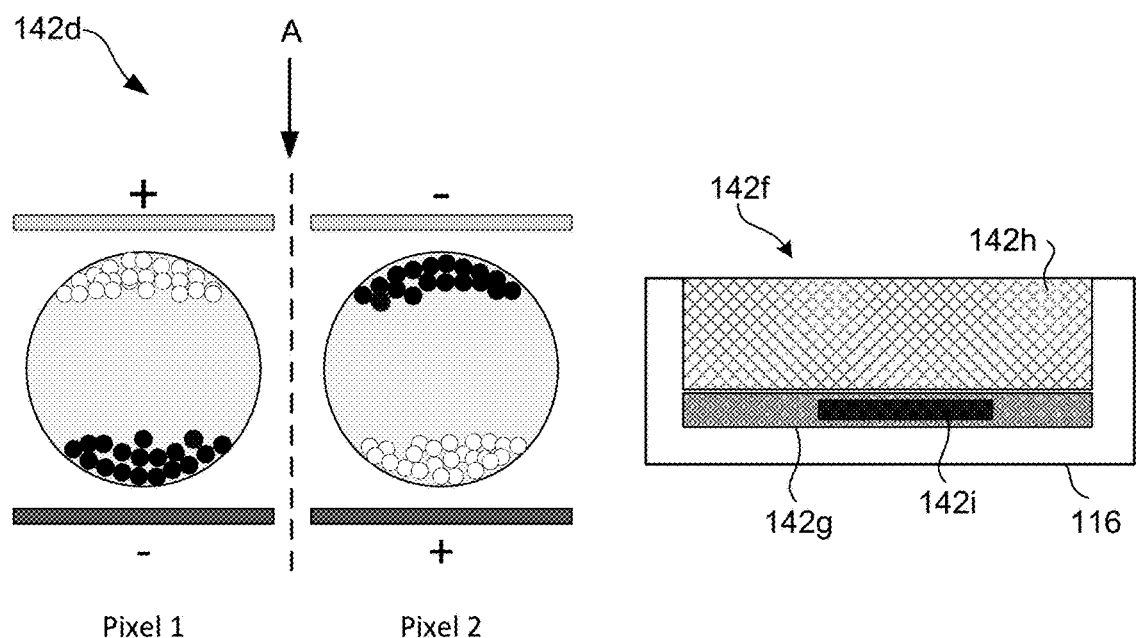
Fig. 3b
Fig. 3c

LOCK OR UNLOCK INDICATOR ON A DATA STORAGE DEVICE

TECHNICAL FIELD

This disclosure relates to a data storage device that can be selectively locked and unlocked, and that provides an indication of such to a user of the data storage device.

BACKGROUND

Data storage devices (DSDs) are electronic devices with the capability to store information in the form of digital data. DSDs are typically deployed as an integrated part of, or as a removable component configured to interface with, a computing system for the purpose of improving the data transmission and storage capabilities of the system. From the perspective of the computing system, a DSD is typically implemented as a block storage device where the data stored is in the form of one or more blocks, being sequences of bytes or bits having a maximum length, referred to as block size.

External DSDs are commonly used to supplement the data storage capabilities of a computer system. For example, external DSDs are often standalone physical devices which house an internal storage component, such as a hard disk drive (HDD) or a solid state drive (SSD), that provides a host computing system with an additional portion of non-volatile memory (i.e., the volume of the drive) in which to store digital data. These external drive type devices are connectable to the host computer system via a data path operating over a particular connectivity protocol (e.g., via Universal Serial Bus (USB) cable). In response to being connected to the host computer system, the host computer system recognizes the external drive as a block data storage device such that a user of the device may access the storage of the drive via the data path (e.g., through operation of the host computer). Access to the drive typically enables a user to access (e.g., read, write and/or modify) user data stored on the drive.

Some storage devices provide status or state information to users about the functionality of the data storage device, such as by sending information to a host computer device for display on a screen, or by using light emitting diodes (LEDs). The user data of a data storage device may be secured against access by unauthorized parties.

SUMMARY

Disclosed herein is a data storage device comprising: a non-volatile storage medium configured to store user data; a data port configured to transmit data and power between a host computer system and the data storage device; a data access state indicator; and a controller configured to: selectively set a data access state of the data storage device to either: an unlocked state to enable access to the user data; or a locked state to disable access to the user data; and generate an indicator control signal to cause the data access state indicator to indicate the data access state, wherein the data access state indicator is configured to indicate the data access state irrespective of whether the data storage device is powered through the data port.

In some embodiments, the data access state indicator includes one or more persistent display components configured to display a visual representation of the data access state, and to retain the visual representation in the absence of power.

In some embodiments, the data access state indicator includes a color changing surface having an electrochromic material configured to change color in response to a voltage applied to the material to indicate the data access state of the data storage device.

In some embodiments, the locked state, no voltage is applied to the material and wherein the corresponding color of the color changing surface indicates a locked state.

In some embodiments, the generation of the indicator control signal by the controller comprises: determining the data access state of the data storage device; determining an access color corresponding to the data access state based on a mapping of, at least, the unlocked state to a first color and the locked state to a second color; determining a voltage to apply to the electrochromic material to change the color of the color changing surface to the access color, wherein the color changing surface retains the access color after cessation of the application of the voltage.

In some embodiments, the data storage device further comprises: an indicator control circuit, and the data storage device is further configured to: transmit the generated indicator control signal to the indicator control circuit to cause the indicator control circuit to: apply the determined voltage to the electrochromic material to change the color changing surface to the access color; and cease application of the voltage to the electrochromic material after change of the color of the color changing surface to the access color.

In some embodiments, the data access state indicator is a bi-stable display panel configured to display an electronic label on a substrate in response to a voltage applied to one or more regions of the substrate, where the label indicates the data access state of the data storage device.

In some embodiments, the generation of the indicator control signal by the controller comprises: determining the data access state of the data storage device; determining an access label corresponding to the data access state based on a mapping of, at least, the unlocked state to a first label and the locked state to a second label; determining a set of voltages to apply to corresponding regions of the substrate of the display panel to change the label of the bistable display panel to the access label, wherein the bi-stable display retains the access label after the panel is unpowered.

In some embodiments, the data storage device further comprises: an indicator control circuit, wherein the controller is further configured to: transmit the generated indicator control signal to the indicator control circuit to cause the indicator control circuit to: apply the determined set of voltages to the regions of the substrate of the display panel to change the label of the display panel to the access label; and cease application of the set of voltages after change of the electronic label on the display panel.

In some embodiments, the data access state indicator is a display panel including: an underlying layer having a specified static label indicating the data access state of the data storage device; and a display surface layer covering the underlying layer, wherein the display surface layer has an optical transparency that varies in response to an applied voltage.

In some embodiments, the generation of the indicator control signal by the controller comprises: determining the data access state of the data storage device; determining, based on the determined data access state, a voltage to apply to the display surface layer to change the transparency of the display surface layer to reveal or hide the static label of the underlying layer, wherein the static label of the underlying layer remains revealed or hidden after the panel is unpowered.

In some embodiments, the persistent display of the data storage device is configured to obtain power from at least one of: the host computer system via the data port; and an independent power source associated with the data storage device.

In some embodiments, the power supplied to the persistent display is obtained preferentially from the host computer via the data port over the independent power source.

In some embodiments, the independent power source is an ambient power source configured to generate power from an environment around the data storage device.

In some embodiments, the ambient power source comprises: at least one of: one or more solar cells coupled to the data storage device and configured to generate a charge in response to incident solar radiation; and one or more radio-frequency (RF) harvesting components configured to generate a charge in response to contact of the RF components with electromagnetic radiation; and a battery electrically connected to the at least one of the one or more solar cells and the one or more RF harvesting components to store generated charge.

In some embodiments, in response to disconnection of power from the host computer, the data storage device is further configured to: automatically change the data access state from the unlocked state to the locked state; and persistently indicate the locked state without power from the host computer.

In some embodiments, the controller is further configured to generate a physical enable signal to: in response to selectively setting the data access state to the unlocked state, enable transmission of user data between the host computer system and the storage medium via the data port; and in response to selectively setting the data access state to the locked state, disable transmission of user data between the host computer system and the storage medium via the data port.

In some embodiments, the data storage device further comprises a cryptography engine connected between the data port and the storage medium, and wherein the controller is further configured to: in response to selectively setting the data access state to the unlocked state, instruct the cryptography engine to use a decryption key to perform a decryption function to selectively decrypt encrypted user data stored on the storage medium.

Disclosed herein is a method for indicating a data access state of a data storage device, the method executed by a controller of the device and comprising: selectively setting a data access state of the data storage device as: an unlocked state to enable access to user data stored on a non-volatile storage medium of the data storage device; or a locked state to disable access to the user data; and generating an indicator control signal to cause a data state indicator of the data storage device to indicate the data access state, and wherein the data state indicator is configured to indicate the data access state irrespective of whether the data storage device is powered through a data port configured to transmit data and power between a host computer system and the data storage device.

Disclosed herein is a data storage device comprising: means for storing user data; means for transmitting data and power between a host computer system and the data storage device; means for indicating a data state; means for selectively setting a data access state of the data storage device as: an unlocked state to enable access to user data stored on a non-volatile storage medium of the data storage device; or a locked state to disable access to the user data; and means for generating an indicator control signal to cause a data state indicator of the data storage device to indicate the data access state, and wherein the data state indicator is configured to indicate the data access state irrespective of whether the data storage device is powered through a data port configured to transmit data and power between a host computer system and the data storage device.

BRIEF DESCRIPTION OF DRAWINGS

Some embodiments are described herein below with reference to the accompanying drawings, wherein:

FIG. 2a illustrates a perspective view of the DSD having an enclosure including a color changing surface, in accordance with some embodiments;

FIGS. 2b and 2c illustrate a cross section of a surface of the enclosure of the DSD including the color changing surface, in accordance with some embodiments;

FIG. 3a illustrates a perspective view of the DSD having an enclosure including a bi-stable display panel, in accordance with some embodiments;

FIG. 3b illustrates a schematic diagram of regions of the bi-stable display panel, in accordance with some embodiments;

FIG. 3c illustrates a cross section of a surface of the enclosure of the DSD including a display surface and an underlying surface, in accordance with some embodiments;

DESCRIPTION OF EMBODIMENTS

Figure 1A:
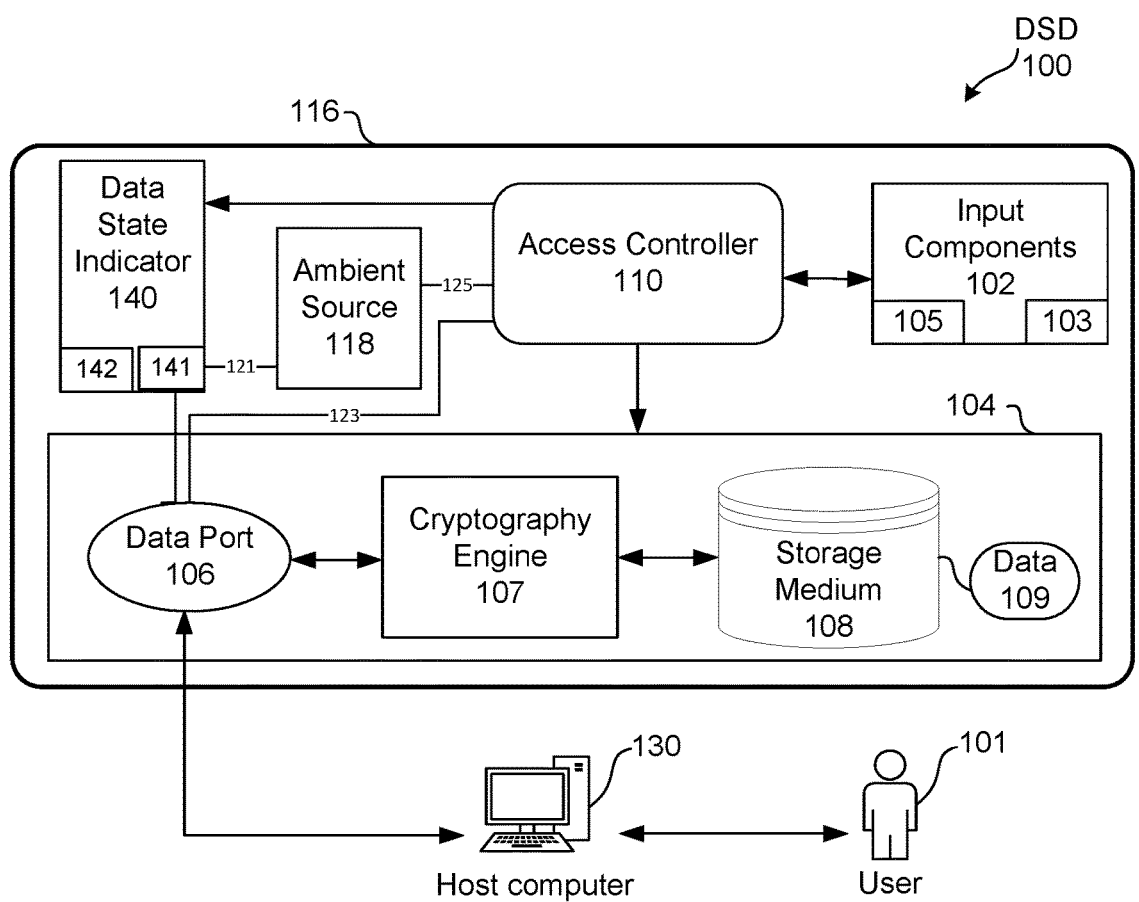
FIG. 1a illustrates an example data storage device (DSD) in accordance with some embodiments.

One way in which user data of a data storage device (DSD) may be secured is by disabling any exchange of data between the internal storage medium of the DSD and an external device connected to the DSD (e.g., a host computer system). That is, the connected device is physically unable to extract user data stored on the internal drive of the DSD, or to write data to the drive. Alternatively, or in addition, securing the user data may involve obscuring the data as it is stored on, or retrieved from, the DSD (e.g., using an encryption function). In both of the aforementioned approaches the DSD implements a "locking" operation that secures user data by preventing (or "disabling") access to the data, either physically or logically. The DSD provides (or "enables") access to the stored user data via a corresponding "unlocking" operation which enables data transmission through the data path, and/or performs decryption of the user data if required, such that the user may access (e.g., read, write and/or modify) user data stored on the drive.

For a DSD with locking and unlocking functions, it is desired to provide a user of the device with information about whether the user data is presently accessible or whether it is secured. Data storage devices are typically configured to be removably connected (e.g., through USB) to host systems, and to be capable of seamless disconnection from the host. Consequently, many such devices lack a display and an independent power source, such as a battery or a power supply associated with the DSD. One option for providing a user with data access information is to send the information to a host computer system, or other external device, connected to the DSD such that the connected device can then display a representation of the data access state (DA State) of the device (i.e., "locked" or "unlocked") to the user.

However, once disconnected the external device may no longer receive data access state information for the DSD. As many DSDs are designed to be portable devices used to offer an ad-hoc storage solution, reliance on a constant connection with a host computer, or other device, to provide a user with data access state information is impractical. Another approach is to use LEDs to indicate the DA state of the device, such as by incorporating the LEDs into a housing, or other outwardly exposed portion, of the DSD that is visible to the user. However, LED indicators require power to operate.

Without an independent power source. LEDs are typically powered by the connected external device (e.g., the host computer). As a result, the disconnection of the external device from the DSD prevents a single LED from accurately indicating a locked or unlocked state of the device (i.e., since the user cannot determine whether an unlit LED is correctly indicating an access state, such as unlocked, or whether it is unlit because it is unpowered). The use of multiple LEDs does not solve this problem, since the user cannot determine the DA state in the case that the DSD is unpowered (as all LEDs will be unlit). It is therefore desired to provide a data storage device that ameliorates one or more of these difficulties, or other difficulties, of the prior art or that at least provides a useful alternative.

With reference to FIG. 1a, there is disclosed an exemplary data storage device (DSD) 100 that selectively controls access of a user 101 of the device 100 to user content data 109 stored thereon, and provides the user 101 with corresponding data access state information via a data access state indicator ("DA state indicator") 140 of the device 100. Specifically, the DSD 100 described herein issues control signals to cause the data access state indicator 140 to indicate the data access state irrespective of whether the data storage device 100 is powered through a data port 106. The data port 106 is configured to transmit data and power between a host computer system 130 and the data storage device 100.

For example, the DSD 100 may communicate with and obtain power from a host computer 130 through a USB port 106 that provides power, as well as enabling the transfer of data between device 100 and host 130. In this case, the host computer 130 acts as an external power source supplying power to the DSD 100 via data port 106. The disclosed data storage device 100 is advantageous in that use of the host computer 130 as a power source can be maintained, while also providing data access information to users even when no power is available from the host computer (e.g., following its disconnection from the device 100).

The DA state indicator 140 is a visual indicator in the described embodiments, configured to visually represent the DA state to the user 101. In some examples, the DA state indicator 140 includes one or more display components integrated, at least partially, into a housing 116 or enclosure of the DSD. Unlike conventional approaches to visually indicating the DA state of a storage device, examples of the display components described herein are persistent components configured to display a particular visual representation of the data access state, and to retain the visual representation in the absence of an external power source. This provides an advantage over the use of conventional indicator components which rely on a supply of power to maintain the visual representation (e.g., LEDs and LCD displays).

In some examples, the DSD 100 includes an ambient power source 118 configured to generate power from an environment around the data storage device 100. The DA state indicator 140 is electrically connected to both the data path 104 and the ambient power source 118 for the purpose of receiving power. That is, the ambient power source 118 is capable of powering the DA state indicator 140 in the case that no power is available from the data path 104 (i.e., via the data port 106) or from any other independent source.

The use of ambient power sources as described herein may provide advantages over powering a DSD using conventional independent power sources, such as an internal battery, including: i) the ability to implement components of the ambient power source with a reduced size compared to conventional internal batteries (since the storage components, if any, of the ambient source will not need to store as much charge); ii) the resulting self-sufficiency of the data storage device, in that the ambient sources generate power passively from the environment, and therefore the DSD does not require power from an external source (e.g., an AC mains connection, or the host 130); iii) enabling the data storage device to transition between the unlocked and locked states (i.e., to secure and unsecure the stored user data) without the receiving power through the data port 106; and iv) enabling a persistent data access state indicator 140 to indicate a transition between data access states that occurs without the DSD 100 receiving power through the data port 106 (i.e., in the case where the data access state changes without the host 130 being connected via port 106).

Therefore, the data storage devices described herein provide an improved solution for selectively securing stored data against unauthorized access, and indicating a corresponding data access state of the device to a user, without requiring the data storage device to be powered by a connected host computer device.

Lockable Data Storage Device

FIG. 1a shows an embodiment of the DSD 100 comprising a data path 104 and an access controller 110. The data path 104 comprises a data port 106 configured to transmit data between a host computer system 130 and the DSD 100. The DSD 100 is configured to register with the host computer system 130 such as to provide functionality to the host computer system 130 of a block data storage device. DSD 100 further comprises storage medium 108 to store user content data 109. The user content data 109 includes one or more blocks of data organized into files, for example including images, documents, videos, etc., according to a particular file system operable by the host computer 130.

The storage medium 108 is non-transitory such as to retain the stored block data irrespective of whether the medium 108 is powered. The medium 108 may be a hard disk drive (HDD) with a rotating magnetic disk or a solid state drive (SSD) and its variations like SLC (Single Level Cell), eMLC (Enterprise Multi Level Cell), MLC (Multi Level Cell), TLC (Triple Level Cell), and QLC (Quadruple Level Cell), and combinations of the above such as SSHD. Any other type of non-volatile storage media may also be used, including emerging non-volatile memory such as Program in Place or Storage Class Memory (SCM), such as ReRam, PCM, and MRAM. Further, the storage medium 108 may be a block data storage device, such that the user content data 109 is written in blocks to the storage medium 108 and read in blocks from the storage medium 108.

The host computer 130 is configured to include a device driver and a data/power interface for communicating with the DSD 100 and providing it with power. The data and power interface operates over data port 106, which may be implemented as, for example, some form of USB port (e.g., USB-A, USB-8, USB-C, mini USB, micro-USB, etc.), a Thunderbolt port, a Power over Ethernet (PoE) port, or a similar port.

The DSD 100 includes a cryptography engine 107 configured to receive, interpret and execute commands received from host computer system 104 according to a predetermined command set, such as for example the standard Advanced Technology Attachment (ATA) or serial ATA (SATA) and/or ATA Packet Interface (ATAPI) command set, which is available from Technical Committee T13 noting that identical functionalities can be implemented within Trusted Computing Group (TCG) Opal, Small Computer System Interface (SCSI) and other proprietary architectures.

The cryptography engine 107 is connected between the data port 106 and the storage medium 108 and is configured to use a cryptographic key to encrypt user content data 109 to be stored on the storage medium 108, and to decrypt the encrypted user content data 109 stored on the storage medium 108 in response to a request from the host computer system 130. That is, the access controller 110 issues commands to the data path components to cause the cryptography engine 107 to control a cryptographic state of the user content data 109 (i.e., encrypted or plain). For example, the access controller 110 may provide a key to the data port 106, which the data port 106 then forwards to the cryptography engine 107 via a SECURITY SET PASSWORD command of the ATA SECURITY feature set.

The access controller 110 is configured to selectively set a data access state (DA state) of the DSD 100 to: an unlocked state to enable access to the user content data 109: or a locked state to disable access to the user content data 109. The access controller 110 is configured to generate a physical enable signal to control the data path 104 such as to enable or disable the transmission of user content data 109 between the host computer system 130 and the non-volatile storage medium 108 via the data port 106. The state of the data path 104, as either enabling or disabling data transmission, is referred to as a physical access state of the DSD.

In one example, the user content could be stored in a plain (i.e., unencrypted) form, and only the generation of the physical enable signal determines whether the user content data is accessible to the host 130. In this case, the device 100 is in an "open" mode of operation where the user content data is not subject to encryption and the physical access state therefore determines whether access to the user content data is enabled or disabled. That is, in the locked data access state the unencrypted user content, data is prevented from passing through the data path 104 to the host computer 130. By contrast, in the unlocked state, the unencrypted data may pass through the data path 104 to the host computer 130 via the data port 106.

The data access state may also be derived based on a cryptographic state of the DSD 100 when the device is operating in a "restricted" mode. In the restricted mode, the cryptography engine 107 uses a cryptographic key to selectively: i) decrypt the user content data 109 stored on the storage medium 108; and ii) encrypt one or more of: the user content data 109 stored on the storage medium 108; and data received from the data port 106 to be stored as user content data 109 on the storage medium 108.

The access controller 110 provides the cryptographic key to at least one component of data path 104 and therefore directs the encryption or decryption of the user content data as part of its control functionality. In one example, the cryptography engine 107 encrypts the user content data "on the fly" as it passes through cryptography engine 107 from data port 106 to storage medium 108, and decrypts the encrypted user content data "on the fly" as it passes through the cryptography engine 107 from storage medium 108 to data port 106.

The cryptographic state of the DSD 100 is determined by cryptographic key used by the cryptography engine 107. In a cryptographically unlocked state, the cryptography engine 107 performs encryption and decryption operations with a particular pre-determined user key associated with the user 101. For example, the user key may be set during a configuration step conducted by the user 101. In a cryptographically locked state, the user key is unavailable to the cryptography engine 107. As a result, data transmitted to or received from the DSD 100 will be obfuscated compared to the corresponding data generated by the cryptography engine 107 in the unlocked cryptographic state. In some embodiments, in the restricted mode the DSD 100 may be configured to obtain the user key via a key transfer process (e.g., involving the host 130 or other external device as described below), or to derive the user key in response to the authentication of the user 101 (e.g., by the user 101 entering an input passcode that matches to a known passcode associated with the DSD 100).

The cryptographic state may be independent of the physical access state. That is, the DSD 100 may enable transmission of data through the path 104, independently to whether the data retrieved from, and stored into, the storage medium 108 is encrypted and decrypted by the cryptography engine 107.

In some embodiments, the DSD 100 controls access to user content data 109 by the selective setting of the physical access state by the access controller 110 of the DSD 100 (i.e., the control of whether the host 130 can exchange data in any form, encrypted or plain, with the device 100). That is, the data access state of the DSD 100 is "locked" or "unlocked" in accordance with the corresponding physical access state. In such implementations, the access controller 110 is configured to set the enable signal to selectively set the data access state of the device 100, to either: an unlocked state to enable transmission of user content data 109 between the host computer system 130 and the storage medium 108 via the data port; or a locked state to disable transmission of user content data 109 between the host computer system 130 and the storage medium 108 via the data port 106.

In other embodiments, the data access state may be determined based on the cryptographic state, or from both the physical access state and the cryptographic state. For example, the DSD 100 may be considered to be "unlocked" if user content data 109 can physically pass through the data path 104 and if the user key is available for encryption and decryption in the restricted mode (i.e., based on both the physical access and cryptographic access states).

In the examples discussed, the data storage device 100 includes one or more input components 102 configured to accept an input from the user 101. For example, the input components 102 may include a: set of buttons 103; and a keypad 105, or a similar arrangement of mechanical components that collectively enable the selection of digits or characters for entering into the device 100. The input components 102 may also include one or more communications devices, such as a wireless modem, configured to receive and transmit data wirelessly via the transmission of an electronic message in a predetermined form.

The user 101 operates the input components 102 to change the data access state of the device 100. For example, the user 101 may actuate respective "Lock" and "Unlock" buttons of set 103 to request that access to the user data 109 be disabled or enabled respectively. In some examples, a cryptographic key can be transferred to the device 100 by the host 130, or by a separate external device such as a phone. The transfer may occur via networked communication with a remote server, via direct transfer based on a local connection between the devices (e.g., in the case that the separate device is plugged into the DSD). The cryptographic key may be provided via direct input into a user interface on the DSD 100 (e.g., via input components 102).

In some examples, the access controller 110 controls access to the user content data 109 based on an authentication process. For example, to unlock the device 100, and thereby access the stored user data 109, the user 101 first authenticates themselves with the DSD 100. Authentication may be performed by any one of a variety of authentication processes which verify the identity of the user 101 as an authorized user to access the stored data 109.

In some examples, user authentication may proceed via the use of an input passcode which is entered into the DSD 100 via the input components 102. For example, in response to the entry of an input passcode by user 101 into keypad 105, corresponding input passcode data (representing the input code) is generated by the components 102 and transmitted to the access controller 110. The access controller 110 may compare the input password to a known unlock password, and authenticate the user 101 in response to a match between the input and unlock passwords. Following authentication of the user 101, the access controller selectively sets the DA state of the data storage device 100 to a state requested by the user 101 (e.g., to the unlock state such that the user 101 can access the data 109 via host 130).

The DSD 100 includes an enclosure 116 configured to physically house the components of the device 100. The enclosure 116 is formed from a rigid, or semi-rigid, material with particular properties (e.g., electrical resistance and impact strength) suited to protecting the internal components of device 100. For example, the material of the enclosure 116 may include a polycarbonate (PC), an acrylonitrile butadiene styrene (ABS), an acrylic, a thermoplastic polyester, a metal, or a combination of any of these.

The DSD 100 includes at least one data access state indicator 140 configured provide the user 101 with an indication of the data access state of the DSD 100. The DA state indicator 140 has sub-components including one or more display components 142 capable of visually displaying the data access state to user 101.

In the described embodiments, the display components 142 include at least one of: i) a color changing surface; and ii) a bi-stable panel, each forming at least a portion of the enclosure 116 of the device 100. Accordingly, the display components 142 are persistent components configured to retain a particular visual representation in the absence of a power source, such as when the device 100 is not receiving power through the data port 106 (e.g., due to a disconnection of the host 130). The DA state indicator 140 also includes an indicator control circuit configured to interface with the access controller 110 and drive the display components 142 in response to an indicator control signal, as described herein below.

The DA state indicator 140 receives power from the data path 104, as supplied by the host computer 130. In some embodiments, the DSD 100 includes an independent power source electrically connected to, at least, the DA state indicator 140 and the access controller 110, and configured to generate, process, and storage electrical energy to power the indicator 140 and controller 110 components. The independent power source may be an ambient power source 118 configured to generate power from an environment around the DSD 100, and to thereby enable DSD 100 to self-sufficiently power the DA state indicator 140 (i.e., to provide power to the indicator without reliance on a connection with the host 130).

In the described examples, the ambient power source 118 is implemented as: 1) a solar based source configured to generate electrical energy from solar radiation incident on the device 100; or 2) a radio-frequency (RF) based source configured to generate electrical energy from RF waves. The ambient power source 118 may also include an internal battery configured to store generated charge for supplying to the access controller 110 or DA state indicator 140, as described herein below.

Figure 1B:
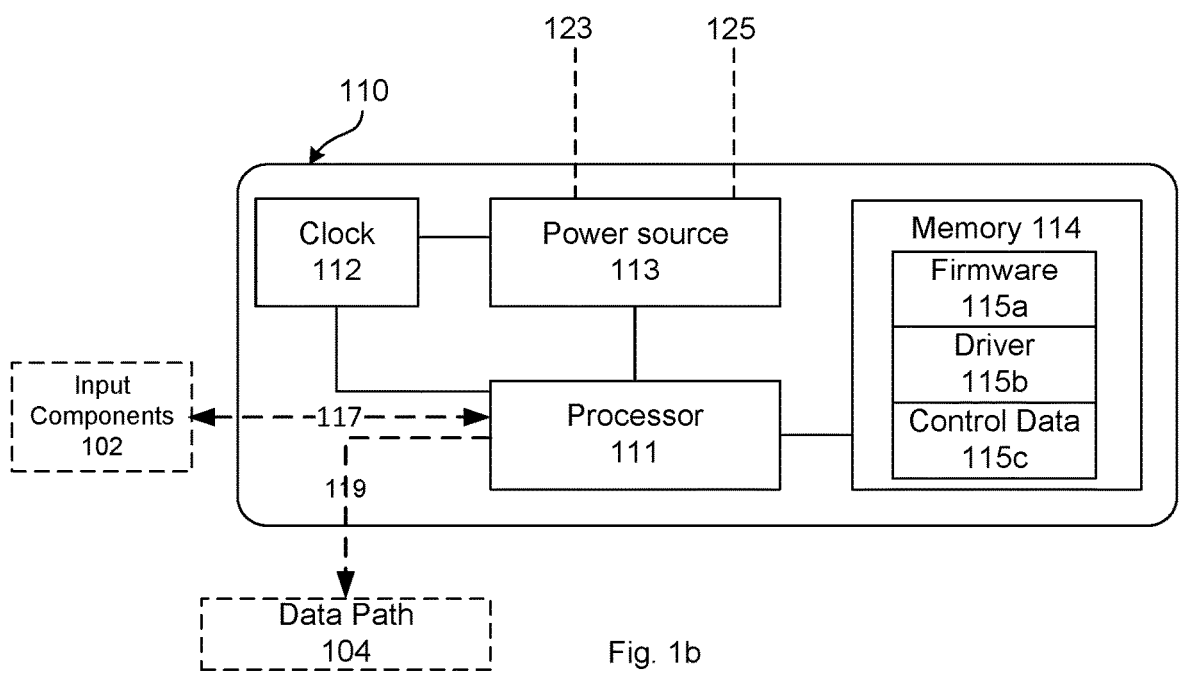
FIG. 1b illustrates a block diagram of an access controller of the example DSD in accordance with some embodiments.

FIG. 1b illustrates an exemplary embodiment of the access controller 110 which includes: a processor 111; a clock 112 in communication with the processor 111; memory modules in the form of a system memory 114, and a firmware 115, configured to exchange data with the processor 111 and a power source 113 configured to power, at least, the processor 111 and the clock 112. In some examples, the power source 113 is an internal battery configured to supply power exclusively to components of the access controller 110. In some examples, the power source 113 accepts input power from the data port 106 and/or the ambient source 118 (discussed herein below) via the power flows 123 and 125 respectively. In such examples, the power source 113 may be a rechargeable battery configured to be charged by flows 123 and 125, or a conversion or pass-through module enabling the access controller 110 to be powered by flows 123 and/or 125.

The processor 111 is configured to execute program code stored within the system memory 114 to issue commands for controlling the operation of the DSD 100. The function of the processor 111 includes, but is not limited to, generating: the enable signal, and a corresponding disable signal, to control data transmission through data path 104; cryptography engine control signals to direct the encryption or decryption of the user content data 109 by cryptography engine 107; and indicator control signals to control the operation of at least one data access state indicator 140 (DA state indicator) of the device 100, as described herein below.

Processor 111 is configured to receive input data from data path 104 and input components 102 via flows 119 and 117 respectively. For example, processor 111 receives data representing an input passcode entered into the DSD 100, as generated by the input components 102, and generates enable and/or cryptography engine signals in response to the input passcode matching to the unlock passcode maintained by the access controller 110. Processor 111 generates and transmits user interface (UI) control signals to the input components 102 to manage one or more UI elements of the components (e.g., LEDs associated with the keypad and buttons). Processor 111 receives a clocking signal from clock 112, which is processed to produce timestamp values representing instants in real-time that are used by the access controller 110 (e.g., by the user authentication process).

The system memory 114 stores device specific data, including at least a unique identifier of the DSD 100, referred to as the device identity key (IDK), and an indication of the DA state of the DSD 100. For example, the DA state may be represented by a binary data access variable having values '0' or '1' representing the "unlocked" and "locked" states of the device 100 respectively. The cryptographic state of the DSD 100 may be similarly represented by a data cryptography variable (i.e., '0' indicating plain data, and '1' indicating encrypted data).

In examples where a user authentication process is performed to change the data access state of the DSD 100, the system memory 114 is configured to store authentication data of the device 100. The authentication data includes unlock passcode data representing the unlock passcode for unlocking the DSD 100, and any other data required by the device 100 to perform user authentication.

In some embodiments, the system memory 114 also includes: a firmware 115*a*; and one or more drivers 115*b* for implementing the DA state indication functionality described herein. The firmware 115*a* and drivers 115*b* may be stored in a separately partitioned area of system memory 114, or in one or more dedicated hardware modules, such as caches, registers, or a combination of these.

The processor 111 is configured to execute the firmware 115*a* and drivers 115*b* to control the data access state of the device 100, and the DA state indicator 140 such as to indicate the data access state to the user 101. Firmware 115*a* has associated indicator control data 115*c* representing one or more parameters of the display components 142 for indicating the data access state according to the type or form of DA state indicator 140. For example, the indicator control data of a DA state indicator 140 including an electrochromic material may specify color data representing a plurality of colors which may be assumed by the color changing surface (i.e., the display component 142) of the material. In another example, the indicator control data 115*c* may specify label data representing labels that may be rendered on the bi-stable display panel of a DA state indicator 140.

In some examples, the firmware 115*a* includes a mapping of the data access state (e.g., unlocked or locked) of the device to particular parameter values associated with the display components, as described herein below. Driver 115*b* defines a set of functions that are executable by the processor 111 in order to generate indicator control signals, in response to input indicator control parameters, for control of the DA state indicator 140. In some embodiments, the driver 115*b* and/or the control data 115*c* are part of the firmware 115*a*.

The processor 111 is configured to execute the firmware 115*a* and the driver 115*b* to generate the indicator control signal in order to cause the DA state indicator 140 to indicate the data access state. Specifically, processor 111 transmits the indicator control signal, as generated by the driver 115*b*, to the indicator control circuit 141 of the indicator 140. The indicator control circuit 141 is indicator specific, and is configured to interpret the signal generated by the corresponding indicator specific driver 115*b* to drive the display components 142 to visually represent the data access state. For example, the indicator control circuit 141 of a DA state indicator 140 including an electrochromic material may include a color surface interface for applying commands of the indicator control signal (as generated by a color driver 115*b*) to the color changing surface 142.

Persistent Visual Indicators

FIGS. 2*a*, 2*b*, 2*c*, and 3 illustrate embodiments of particular display components 142 that provide a persistent visual indication of the data access state of DSD 100. In the illustrated embodiments, DSD 100 is an external storage drive in the form of a direct access storage (DAS) device configured to be removably connected to, and easily disconnected from, the host system 130 in an ad-hoc manner. The data port 106 is configured to accept a USB connector for connecting DSD 100 to the host computer 130. The enclosure 116 houses a storage drive 108 in the form of an SSD for storing data 109. DSD 100 is configured to obtain power through the USB connector in response to a connection to the host system 130 via data port 106. Input components 102 include button set 103 including at least buttons to control the data access state of the device 100 (e.g., "Unlock" and "Lock" buttons for actuation by the user 101).

In one embodiment, as shown in FIGS. 2*a*-2*c*, the display components 142 include a color changing surface 142*a* incorporated within a portion of enclosure 116, where the surface 142*a* retains a selected color without power. Surface 142*a* is formed from at least one electrochromic material (chromophore), having optical properties (e.g., optical transmission, absorption, reflectance and/or emittance) that are controllable in a continual but reversible manner on application of a voltage to the material. The color change is persistent, and energy is only needed to cause a color change but not to retain the color.

Electrochromic materials can include metal oxides such as tungsten oxide, molybdenum, titanium and niobium oxides. Some organic compounds, such as viologens, and some conducting polymers, such as polypyrrole, PEOOT polymer, and polyaniline, can also display electrochromic properties. Other types of synthetic materials can also be engineered to incorporate electrochromism. There are many uses for materials with electrochromic properties. For example, in the automobile industry, electrochromic glass is used to automatically tint rear-view mirrors in various lighting conditions. In another example, electrochromic windows can block ultraviolet, visible or (near) infrared light. By blocking infrared light, the energy efficiency of an a structure or enclosure can be increased by reducing heat buildup in the enclosure.

Typically, one or more layers of electrochromic material are combined with other components, such as a voltage application circuit, into an electrochromic device (ED) to achieve the controlled optical properties described above. For example, an ED may consist of two electrochromic (EC) layers separated by an electrolytic layer. Conducting electrodes on either side of both EC layers are used to provide an external voltage and cause a color change. Some electrochromic devices can be categorized into two types: a laminated device which uses a liquid gel, and a solid electrolyte device which uses solid inorganic or organic material.

With reference to FIG. 2*a*, the surface 142*a* may be organized as a single electrochromic layer, as multiple continuous layers, or as separate layers in combination with other components (e.g., electrolytics) to form part of an ED. For ease of reference, the disclosure refers to electronic materials of the surface 142*a* which includes one or more electrochromic materials organized in any of the aforementioned configurations. For example, the indicator control circuit 141 may include components configured to apply a voltage to the electronic materials of surface 142*a*, such that the circuit 141 and the surface 142*a* collectively form an ED.

For example, in one embodiment, an ED may include five superimposed layers on one substrate or positioned between two substrates in a laminated configuration. The two outer layers are transparent conductors, with the two middle layers being an EC layer and an ion-storage layer for conducting ions and electrons. The central layer is an electrolyte for separating the two middle layers. Optical absorption occurs when electrons move into the two middle layers from the transparent conductors along with charge balancing ions entering from the electrolyte in the central layer. Other electrochromic devices in alternative embodiments may use more or less layers.

The optical properties of surface 142a are variable in response to the application of a voltage to the electronic materials. The constituent electrochromic material(s), and therefore surface 142a, is configured to change color in response to a voltage applied to the materials) such as to indicate the data access state of the data storage device 100. This enables surface 142a to maintain a color corresponding to a particular data access state of the DSD 100 without the supply of power to the device 100. For example, following a transition of the device 100 to the locked state, the electrochromic material may indicate the locked state without a voltage being applied to the material.

The change in color of surface 142a may be achieved by the controlled variation of one or more optical properties of the electronic materials. For example, FIGS. 2b and 2c illustrate a side cross section of surface 142a, as incorporated within enclosure 116, using an electrochromic material 142b that changes transparency. The surface 142a may be a top side of the DSD 100 as depicted in FIG. 2a. Underneath the electrochromic material 142b is a colored layer 142c. Both the colored layer 142c and the electrochromic material 142b, in an opaque state, have associated a particular default color (e.g., red, blue, green, yellow, etc.) corresponding to a particular access color, as described below. FIG. 2b shows the electrochromic material 142b in a transparent state, such that the colored layer 142c is visible as the color of the color changing surface 142a. FIG. 2c shows the electrochromic material 142b in the opaque state, preventing the colored layer 142c from being visible. In this state, the color changing surface 142a assumes the color of the electrochromic material 142b.

While the above disclosure refers to the use of an electrochromic material within a single layer, other embodiments may implement multiple electrochromic layers to achieve the color changing functionality of surface 142a. Alternatively, or in addition, the electrochromic material 142b may not necessarily be a singular material and may contain other materials forming a material layer capable of controlled transparency. For example, the electrochromic material 142b may be an electrochromic device comprising of several layers that together provide the described color changing capability.

As shown in FIGS. 2a-2c, color changing surface 142a is formed as an integral portion of the enclosure 116. The dimensions of the surface 142a may vary according to embodiments of the DSD 100. For example, the size of the surface 142a may be limited to a sub-region of a surface of the enclosure 116 as depicted in FIG. 2a. In other embodiments, the enclosure 116 may be wholly or mostly made of the color changing surface 142a. The remaining parts of the enclosure 116 are formed from a normal, non color changing material, such as ordinary polymer, plastic, and/or metal materials. For example, a small device, such as a flash drive, may use a color changing surface 142a for the entire enclosure 116, except for the USB connector, which requires a conductive material such as a metal. In this case, the entire device 100 excluding the connector will change color to indicate the data access state of the device 100.

The non color changing materials are typically of a lower cost than electronic materials, and so the overall costs of the enclosure 116 may be reduced by only having a portion of the enclosure 116 include the color changing surface 142a. In some embodiments, surface 142a be may formed as a strip, or patch, applied to a portion, or to the entirety, of the enclosure 116.

In another embodiment, as shown in FIG. 3a, the display components 142 include a bi-stable display panel 142d incorporated within, or affixed to, a portion of enclosure 116. The bi-stable display panel 142d is configured to display a selected label 142 electronically on a substrate of the panel 142d in response to a voltage applied to one or more regions of the substrate.

In some embodiments, display panel 142d is an electrophoretic display including a microencapsulated electrophoretic medium configured to render label 142e by forcing a migration of the encapsulated particles at each of the regions of the substrate such that the panel 142d retains label 142e without power. In such embodiments, display panel 142d may be implemented using an E ink (e.g., Spectra or Kaleido), or a similar technology. That is, in response to the application of a voltage to the substrate, the label 142e is selectively imprinted onto panel 142d, which acts as a persistent visual indicator (i.e., an electronic paper) capable of retaining the imprinted label 142e without power.

Electrophoretic displays function by causing the controlled migration of microencapsulated particles at specific regions on a substrate in response to an applied voltage. In one embodiment, the substrate includes multiple layers, including a transparent upper electrode layer, a liquid polymer layer containing the microencapsulated particles, and a lower electrode layer. The microencapsulated particles are titanium dioxide particles approximately one micrometer in diameter dispersed in a hydrocarbon oil within the polymer layer. A dark-colored dye is added to the oil, along with surfactants and charging agents that cause the particles to take on an electric charge. This mixture is placed between two parallel, conductive plates (i.e., forming the upper and lower electrode layers) separated by a gap of 10 to 100 micrometres.

A voltage is applied across the two plates, to cause the particles to migrate electrophoretically to the plate that bears the opposite charge from that on the particles. The migration of the particles to the front (viewing) side of the panel 142d, causes the panel to appear white at the corresponding region (i.e., since the light is scattered back to the viewer by the titania particles), The migration of the particles to the rear side of the display 142d causes it to appear dark (i.e., since the incident light is absorbed by the colored dye). Accordingly, dividing the substrate into a number of small picture elements (i.e., pixels) enables the creation of a pattern of reflecting and absorbing regions, and therefore the formation of images (such as label 142e), in response to the application of the appropriate voltage at each pixel location. FIG. 3b shows an implementation of an electrophoretic display including two microcapsules controlling two respective pixel regions. Each capsule contains an oily solution containing a black dye (the electronic ink), with numerous white titanium dioxide particles suspended within. The particles are slightly negatively charged, and each one is naturally white. A positive charge to the surface electrode attracts the particles to the top of local capsules, causing the surface of display 142d to appear white when viewed from direction A (i.e., pixel 1). Reversing the voltage repels the particles to the bottom of local capsules resulting in the black dye moving to the surface of 142d and turning the pixel black (i.e., pixel 2).

With reference to FIG. 3a, label 142e includes text that is selected to indicate the data access state of the data storage device 100. In the described embodiments, the text of label 142e is set to "Locked" (depicted) or "Unlocked", as imprinted on panel 142d, to indicate the corresponding data access states of the DSD 100. In other embodiments, label 142e may be set to a selected icon or image, or to a 'blank' or null label in which all pixel regions are set uniformly to black or white, according to the data access state of the device 100. For example, label 142e may be set to a padlock icon in response to the data access state changing to the locked state. The label 142e may be set to a null label in response to the data access state changing to the unlocked state, such that the padlock icon is no longer rendered on the panel 142d.

In another example, label 142e may be a text label with a static sub-part that remains constant and a variable sub-part which is altered in accordance with the data access state. For example, where the label 142e is selected as "LOCKED" or "UNLOCKED", the panel 142d may function such that the "LOCKED" portion remains displayed and the "UN" prefix is visible or hidden (i.e., depending on the data access state). In this case, the display 142d may indicate the data access state with improved power efficiency and/or complexity (i.e., since the number of regions on the substrate to which voltages must be applied in response to a change in data access state is reduced).

FIG. 3c shows another embodiment in which the data state indicator 140 includes a panel 142f configured to include an underlying layer 142g in combination with a display surface 142h having a varying optical transparency according to the data access state. Specifically, underlying layer 142g includes a static label 142i that is a specified fixed icon, text, or image label, applied on to, or integrally formed with, the underlying layer 142g of the panel 142f. Panel 142f includes an upper layer 142h configured as the display surface, which may be implemented, for example, as an electrochromic material, a bistable display, or a liquid crystal display (LCD). The display surface 142h acts as an optical shutter that is either opaque, thereby blocking from view the static label 142i rendered on the underlying surface 142g, or transparent, thereby enabling the label 142i to be seen by a user 101.

In one example (not shown), the underlying layer 142g is the enclosure 116 and label 142i is formed by applying an ink to the outer surface of enclosure 116 in a region beneath the display surface 142h of panel 142f. Alternatively, the underlying layer 142g may include a translucent plastic material containing the label 142i that is affixed onto, or incorporated within, the enclosure 116. The underlying layer 142g may also include a backlit LED to illuminate the label 142i thereby enhancing its visibility in low light conditions. In these embodiments, the panel 142f has multiple functional states, including for example: a "closed" state in which the optical shutter display surface 142h is opaque, an "open" state in which the optical shutter surface 142h is transparent with the LED off; and an "open and backlit" state in which the optical shutter surface 142h is transparent with the LED on. This takes advantage of the low power requirements of the bistable, electrochromic, or LCD display surface and of the LED lighting source (which can be active when the drive receives external power and certain access criteria are met).

Indicating the Data Access State

Figure 4:
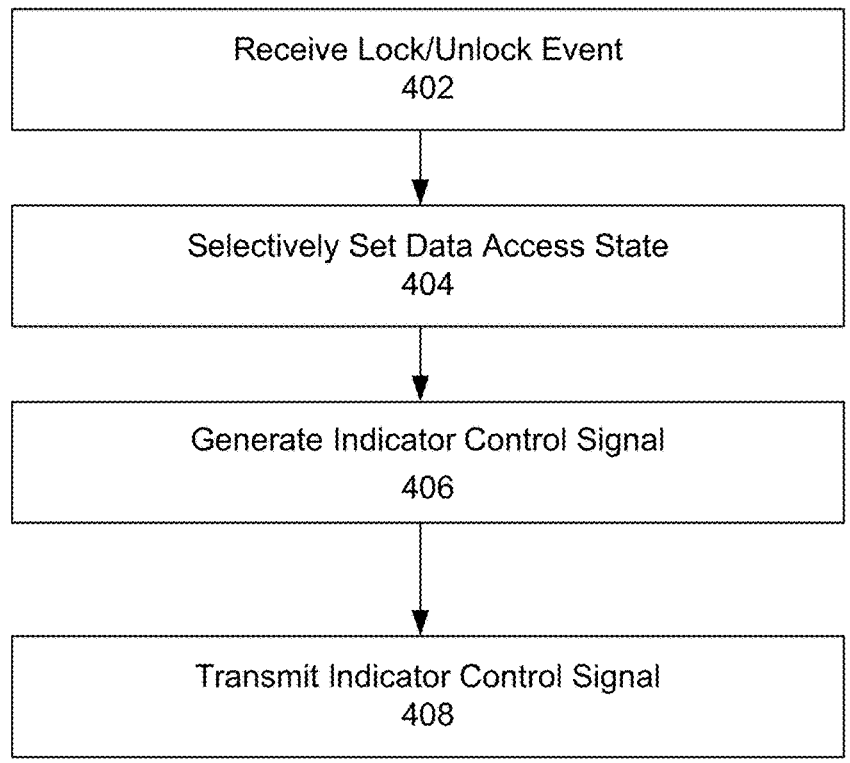
FIG. 4 illustrates a flow diagram of a process for indicating a data access state of the DSD, in accordance with some embodiments.

FIG. 4 illustrates a method 400 for indicating a data access state of the DSD 100 according to the described embodiments. The steps of the process 400 are implemented at least in part by the DSD 100 or its components, such as the access controller 110. At step 402, the controller 110 receives a lock/unlock event representing an action that triggers a change in the data access state of the DSD 100. The lock/unlock events are generated, at least, in response to any of the following:

(1) the selection of a locking or unlocking function of the device 100 by user 101; and (2) the execution of one or more internal functions of the access controller 110.

With reference to (1), lock and unlock events are generated in response to the user 101 selecting a locking or unlocking function of the DSD 100 via the input components 102. For example, the button set 103 may include "Lock" and "Unlock" buttons which the user 101 actuates to cause the generation of a corresponding lock or unlock event by the controller 110. In some embodiments, actuation of the "Unlock" button, or element, of the input components 102 initiates the unlocking function, where completion of the function (i.e., cause the controller 110 to generate the unlock event) is subject to the authentication of the user 101 by a user authentication process. For example, in the case of a password based authentication process, the controller 110 generates the unlock event in response to an input password of the user 101 (e.g., a personal identification number (PIN) code entered into the device 100 via, buttons 103 or keypad 105) matching to an unlock password of the device 100.

With reference to (2), in some embodiments the access controller 110 is configured to perform one or more internal functions to cause the generation of lock or unlock events to automatically set the data access state. For example, the controller 110 may perform an activity monitoring function to track the amount of time that has passed since the transmission of data through the data path 104. This is referred to as the device data transmission idle time. If the data transmission idle time exceeds a threshold value (e.g., 60 minutes), as maintained within memory 114 of the controller 110, then the controller 110 may generate a lock event to automatically lock the DSD 100, such that a corresponding unlock event is required to regain access to the data 109. The unlock event may involve the entry of a PIN code, and/or the execution of an entire key transmission and unlock process, to grant the user 101 access the DSD 100. This is an example of an automated security function of the controller 110, which may be implemented to protect the user data 109 against any unauthorized access that may otherwise result if, for example, the device 100 is left unattended for a prolonged period while connected with the host computer 130.

At step 404, the controller 110 processes the generated lock or unlock event to selectively set the data access state of the DSD 100. The processor 111 sets the data access state by changing the value of the binary DA state variable in memory 114 to a value of '0' or '1' in the case of a transition to the "unlocked" and "locked" states respectively. That is, in response to an unlock event, the controller 110 sets the DA state to the unlocked state to enable access to the user data 109 via the data port 106. Alternatively, in response to a lock event, the controller 110 sets the DA state to the locked state to disable access to the user data 109 via the data port 106. In other embodiments, the controller 110 may modify the cryptographic state and/or physical access state of the device 100 in response to a lock or unlock event (e.g., to direct the cryptography engine 107 to perform subsequent encryption or decryption operations with a particular cryptography key).

The controller 110 generates an indicator control signal to cause the data access state indicator 140 to indicate the DA state of the device 100, and transmits the generated indicator control signal to the indicator 140, at steps 406 and 408 respectively. The controller 110 is configured to generate the indicator control signal according to type of DA state indicator 140 implemented by the device 100, including the display components 142 and indicator control circuitry 141.

Figure 5:
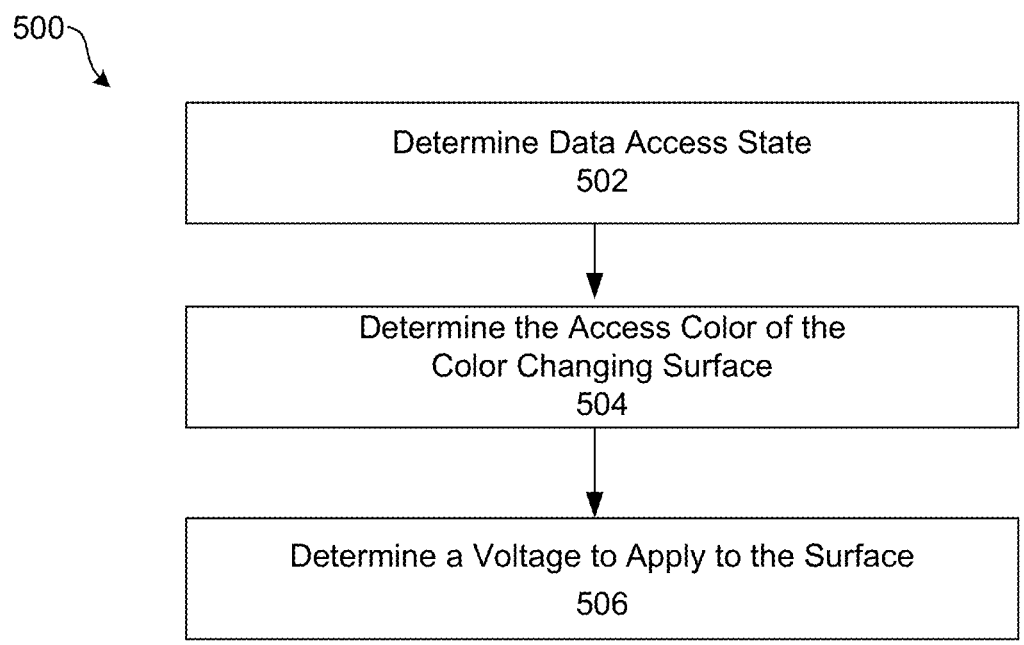
FIG. 5 illustrates a flow diagram of the generation of an indicator control signal for a color changing surface, in accordance with some embodiments.

FIG. 5 illustrates a process 500 to generate the indicator control signal in the case that indicator 140 includes persistent display components 142 in the form of a color changing surface (as depicted in FIGS. 2a-2c). At step 502, the controller 110 determines the data access state of the device 100. Processor 111 obtains the DA state by accessing memory 114 to retrieve the value of the binary DA state variable. With reference to process 400, the DA state value retrieved by the processor 111 during step 406 corresponds to the access state selectively set by the controller 100 in previous step 404 (i.e., in response to an lock/unlock event).

At step 504, the controller 110 determines an access color corresponding to the determined data access state. The access color is determined based on a mapping of, at least, the unlocked state to a first color and the locked state to a second color. In the described embodiments, the access controller 110 is configured to maintain a mapping of particular colors to the data access states to determine the access color. This mapping may be stored in the firmware 115a or as part of the indicator control data 115c. For example, in one mapping the indicator control data 115c specifies a CMYK color model representation of each access color (i.e., as access color data) as follows:

| Data Access (DA) state of DSD 100 | DA state variable value | Access color | Access color data (cyan, magenta, yellow, black) |
|---|---|---|---|
| Unlocked | 0 | Blue | (100, 100, 0, 0) |
| Locked | 1 | Red | (0, 99, 100, 0) |

In this example, the locked and unlocked states are represented by red and blue colors respectively, and indicator control data 115c maps binary DA state variable values to corresponding integer vectors of CMYK colors. In other embodiments, the indicator control data 115c may include access color data representing the values of other optical properties of the electronic materials of surface 142a. In the example discussed above, indicator control data 115c maps transparency values of electrochromic material 142b to the data access state of the device 100, such that surface 142a assumes the appropriate access color in response to a change in the transparency of the material 142b.

At step 506, the controller 110 determines a voltage to apply to the electrochromic material to change the color of the color changing surface 142a to the access color. Processor 111 determines the voltage value by retrieving parameters including a subset of the indicator control data 115c corresponding to the DA state (e.g., vector (0, 99, 100, 0) for the locked state) and a routine of firmware 115a with the retrieved parameter data. The routine is specific to surface 142a and returns one or more voltage values to apply to the electrochromic material of the surface 142a to affect a change in its color to the access color.

The processor 111 is configured to generate the indicator control signal by invoking driver 115b with the determined voltage values, and other data relevant to the control of the optical properties of surface 142a as stored in firmware 115a. Driver 115b is specific to the color changing surface 142a and generates an appropriate indicator control signal to direct the function of the control circuit 141, and thereby control the color changing surface 142a.

Returning to FIG. 4, at step 408 the controller 110 transmits the indicator control signal to the control circuit 141 of DA state indicator 140. The indicator control circuit 141 includes one or more electronic components that are configured to process the received indicator control signal to: apply the determined voltage to the electrochromic material to change the color changing surface 142a to the access color (e.g., red); and cease application of the voltage to the electrochromic material after change of the color of the surface 142a to the access color.

In some embodiments, the surface 142a is part of an electrochromic device, and the indicator control circuit 141 includes electrodes configured to apply the determined one or more voltages to the electronic materials according to the specific organization of the surface 142a In the example above the control circuit 141 directs the application of a voltage to alter the transparency of the material 142b. Specifically, in response to material 142b becoming transparent, as shown in FIG. 2b, colored layer 142c below the electrochromic material 142b is revealed, causing the surface 142a to assume the color of the colored layer 142c (i.e., as the access color).

In response to material 142b becoming opaque, the colored layer 142c is covered and the color of material 142b is assumed as the access color. For example, the colored layer 142c may be red and the electrochromic material 142b becomes transparent to transform the color changing surface 142a to red (i.e., to indicate a locked device) by permitting the colored layer 142c to be seen.

The color changing surface 142a may remain a default color of the electrochromic material 142h. The default color may be set to the first color corresponding to the unlocked state, such that a transition to the second color corresponding to the locked state occurs in response to the material 142b being made transparent by the control circuit 141. In some embodiments, the default color of the material 142b may match the color of the enclosure 116.

Accordingly, by executing steps 504 and 506 the controller 110 performs a controlled variation of the color of surface 142a to the access color, such that the surface 142a indicates the DA state of the device 100, and where the surface 142a retains the access color after cessation of the application of the voltage (i.e., irrespective of whether the indicator is powered after the visual transition occurs).

Figure 6:
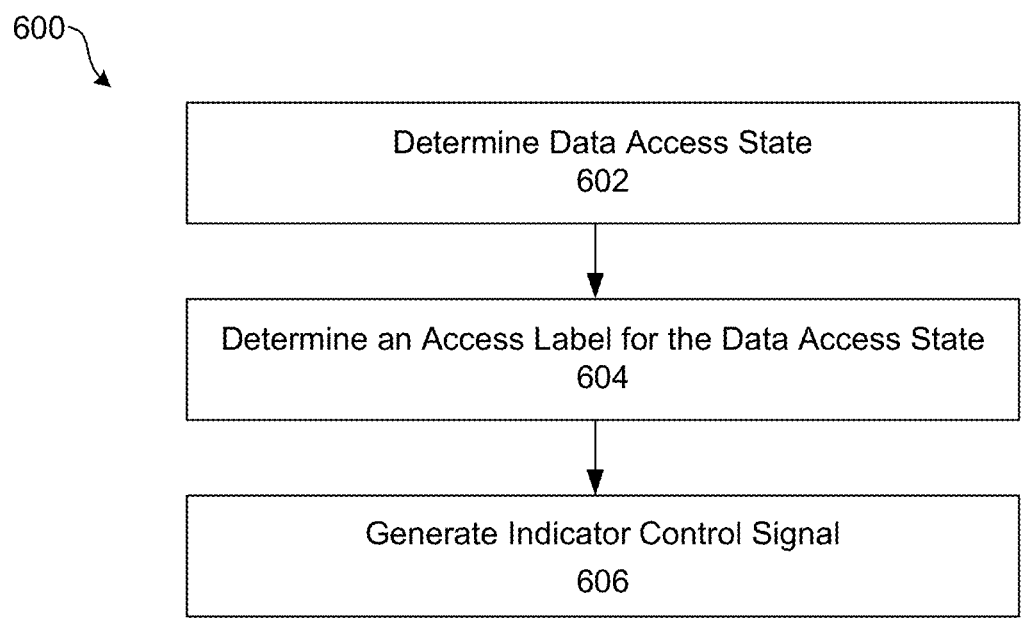
FIG. 6 illustrates a flow diagram of the generation of an indicator control signal for a bi-stable display panel, in accordance with some embodiments.

FIG. 6 illustrates a process 600 to generate the indicator control signal in the case that indicator 140 includes persistent display components 142 in the form of a bi-stable display panel (as depicted in FIG. 3a). At step 602, the controller 110 determines the data access state of the device 100. As described above for step 502, processor 111 obtains the DA state by retrieving the value of the binary DA state variable from memory 114.

At step 604, the controller 110 determines an access label corresponding to the determined data access state. The access label is determined based on a mapping of, at least, the unlocked state to a first label (i.e., the static text label "Unlocked") and the locked state to a second label (i.e., the static text label "Locked"). In the described embodiments, indicator control data 115c includes, for each voltage controllable region of the substrate (i.e., each pixel), a 2-dimensional co-ordinate vector (x,y) indicating the relative position of the pixel on the substrate. The access controller 110 is configured to maintain, for each data access state label, a mapping indicating whether particular pixel locations on the substrate are "light" or "dark" (e.g., as binary '0' or '1' values) in order to imprint the label on the substrate. The indicator control data 115c stores the mappings as a matrix structure for the locked label $M_{locked}$ and for the unlocked label $M_{unlocked}$.

A linking map is stored in firmware 115a to link the data access state of the device 100 to the corresponding matrix structures (i.e., the access label data) of the indicator control data 115c, for example as:

| Data Access (DA) state of DSD 100 | DA state variable value | Access label | Access label data |
|---|---|---|---|
| Unlocked | 0 | "UNLOCKED" | $M_{unlocked}$ |
| Locked | 1 | "LOCKED" | $M_{locked}$ |

At step 606, the controller 110 determines a set of voltages to apply to the pixel regions of the display panel 142d to change the label 142e to the access label. Processor 111 determines the voltage values by retrieving access label data from the indicator control data 115c corresponding to the DA state and executing a routine of firmware 115a with the retrieved parameter data as input. The routine is specific to display panel 142d and outputs a set of voltage values to apply to the respective pixel regions of the substrate of panel 142d in order to change the imprinted label to the access label.

The processor 111 is configured to generate the indicator control signal by invoking driver 115b with the determined voltage value set, and other data relevant to the control of the optical properties of panel 142d as stored in firmware 115a. As described above, driver 115b is specific to the display components 142 (i.e., panel 142d) and generates an appropriate indicator control signal to direct the function of the control circuit 141, and thereby control the substrate of panel 142d.

The controller 110 transmits the indicator control signal to the control circuit 141 of DA state indicator 140. The indicator control circuit 141 includes one or more electronic components that are configured to process the received indicator control signal to: apply the determined set of voltages to the regions of the substrate of the display panel 142d to change the label 142e of the display panel 142d to the access label: and cease application of the set of voltages after change of the electronic label 142e on the display panel 142d.

In other embodiments, the data access state indicator 140 includes a display panel 142f with an underlying layer 142g having a static label 142i, and a display surface layer 142h covering the underlying layer 142g. The optical transparency of the display surface layer 142h is variable in response to an applied voltage, such that the surface functions as a shutter to reveal or hide at least a portion of the static label 142i. The controller 110 determines the static access label 142i from label data stored in the memory 114. The transparency values of the display surface 142h are determined by transparency value mapping data of the indicator control data 115c, including an indication of the transparency of the display surface 142h for each data access state. For example, the transparency value map may include, for each of the unlocked and locked data access states: integer values between 0 and 100 representing a desired degree of transparency of the display surface 142h (i.e. with 0 being fully opaque and 100 being fully transparent), and corresponding voltages required to achieve the transparency.

The controller 110 determines a voltage to apply to the panel 142f to change the visibility of the label 142i in response to a change in the data access state of the data storage device 100. That is, by the application the voltage to the display surface 142h of panel 142f the transparency of the surface is altered, resulting in a corresponding variation in the visibility of some, or all, of static label 142i to the user 101.

The voltage is determined by the processor 111 based on the indicator control data 115c corresponding to the DA state, and by executing a routine of firmware 115a. The processor 111 is configured to generate the indicator control signal by invoking driver 115b with the determined voltage value, similarly to the processes described above. In contrast to the embodiments where the distinct access labels 142e are selected and rendered by the panel 142d, the use of a specified fixed label 142i that is revealed or hidden, by an overlying display surface 142h, in response to a change in the data access state does not involve the application of voltages at the pixel-specific level. Instead, the voltage values may be adjusted at the display surface layer level, such as to affect the transparency of the layer and thereby control the visibility of the underlying static label 142i to the user 101 (i.e., rather than manipulating the voltages to control the display a large number of individual pixel regions). This may provide advantages including a reduced cost and a reduced complexity of implementation.

The function of the indicator control circuit 141 varies according to the type of electrophoretic display panel 142d implemented by the indicator 140. In the multi-layered implementation of the substrate described above, the application of individual voltages (as specified by the determined voltage set) is performed using MOSFET-based thin-film transistor (TFT) technology. Specifically, a TFT is allocated to each pixel or lined region on the substrate and the application such that, in response to the collective application of the determined voltages, a high-density image is formed on the substrate to visually render the access label.

The embodiments of the DSD 100 illustrated in FIGS. 2a-2c and 3, depict a DSD 100 with a single DA state indicator 140 being either one of a color changing surface 142a or a bi-stable display panel 142d. In other embodiments, the DSD 100 may be implemented with multiple state indicators 140, such as for example at least one color changing surface 142a and a bi-stable display panel 142d. The display panel 142d may be formed on top of, or integrally with, a portion of the color changing surface 142a to improve the ease with which the user 101 may obtain data access state information of the device 100.

The combined use of both a color changing surface 142a and a bi-stable display panel 142d provides the advantage of more clearly indicating the data access state of the device 100 to a user 101 (i.e., by presenting two different visual representations of the data access state information). For example, a color blind user 101 may not be able to easily ascertain the data access state from observing the surface 142a alone. However, by observing the static textual label 142e imprinted on the bi-stable display panel 142d the user 101 may still be able to determine the data access state irrespective of the color of surface 142a.

Ambient Power Sources

With reference to FIG. 1a, the DSD 100 includes an independent power source (i.e., a source that is not associated with another device) in the form of the ambient power source 118. In the described examples, the ambient source 118 is connected to the DA state indicator 140, and thereby provides the indicator 140 with an alternative source of power to the data port 106. In some embodiments, the power source 118 also supplies power to the access controller 110 by power flow 125.

Figure 7A:
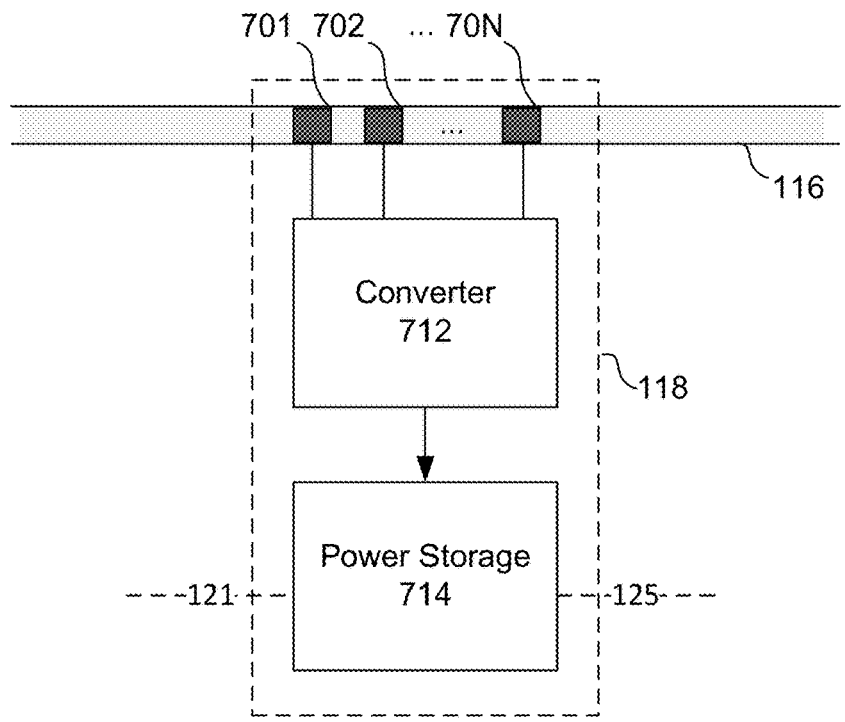
FIG. 7a illustrates a block diagram of a first implementation of an ambient power source of the DSD in accordance with some embodiments.

FIG. 7a illustrates an embodiment in which the ambient power source 118 is a solar based source configured to generate electrical energy from solar radiation incident on the DSD 100. The ambient source 118 includes: one or more solar cells 701-70N, a converter module 712; and a power storage module 714. Solar cells 701-70N are formed on, or integrally within, an outer surface of the enclosure 116 such as to be exposed to solar radiation within an environment of the DSD 100. In one example, the cells 701-70N are organized within a miniature solar panel, where the panel itself is embedded into, or affixed to, the enclosure 116. Alternatively, the cells 701-70N may be incorporated into a flexible and semi-transparent thin-film coating that is printed onto the outer surface of enclosure 116 (i.e., as a 'solar ink').

For example, in one embodiment each cell 701, . . . , 70N is a perovskite solar cell including: a perovskite absorber layer acting as the light-harvesting active layer composed of mesoporous $TiO_2$ coated with a perovskite absorber; and n-type and p-type material layers for electron and hole extraction respectively, where the n-type and p-type material layers are contacted with the active layer to promote the extraction of photogenerated electrons. Perovskite cells 701, . . . , 70N implemented as single junction cells, as described above, operate at approximately 25 percent power conversion efficiency (PCE) rating. However, a maximum efficiency of approximately 29% is possible by implementing the cells as silicon-based tandem cells.

The converter 712 is electrically connected to each cell 701, . . . , 70N, and is configured to receive electrical charge generated by the cells 701, . . . , 70N. The converter 712 accumulates the charge generated by each individual cell 701-70N and outputs an electrical current to the power storage module 714. Power storage module 714 is implemented as a type of internal battery in the described device 100, configured to receive as input the generated energy output by the converter 712, and to supply power to the data access state indicator 140 (i.e., via power flow 121), including the indicator control circuit 141 and display components 142. Converter 712 may be implemented as an ultralow-power circuit configured to regulate the voltages of power provided by the solar cells and the power storage module 714 (e.g., in order to extend the functional life of the module). Some implementations of the source 118 may not include the converter 712 such that storage 714 receives charge directly from solar cells 701-70N.

Figure 7B:
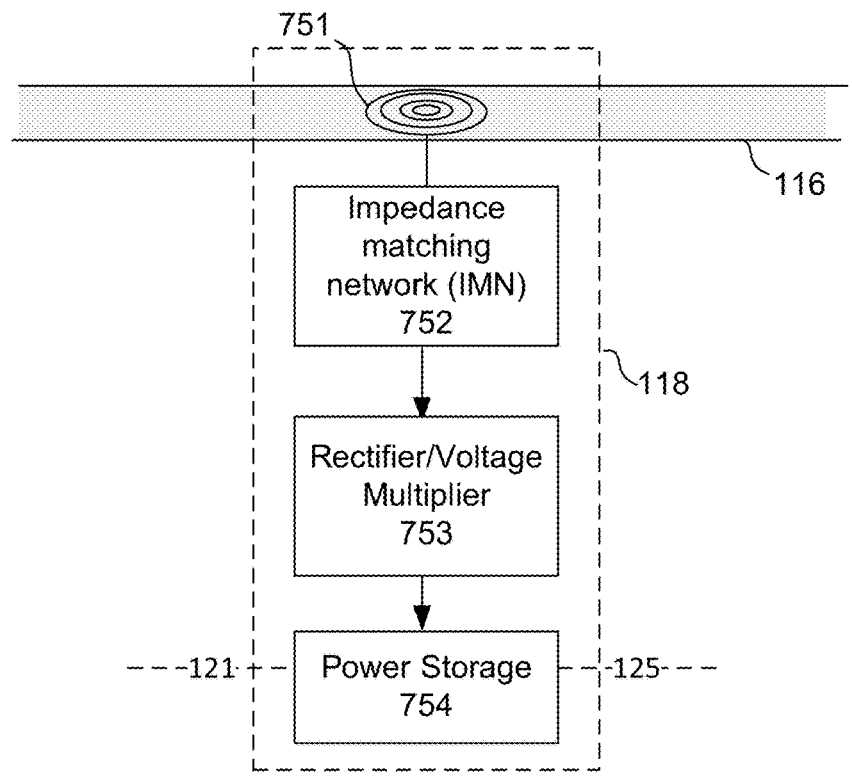
FIG. 7b illustrates a block diagram of a second implementation of an ambient power source of the DSD in accordance with some embodiments.

FIG. 7b illustrates an embodiment in which the ambient power source 118 is a radio-frequency (RF) energy harvester configured to generate electrical energy from RF waves in the environment of the DSD 100. Power harvesting or energy harvesting is a technique to collect energy from the external environment using different methods including thermoelectric conversion, vibrational excitation, solar energy conversion, pressure gradients, and RF signals. RF wireless energy harvesting generates energy from electromagnetic waves by capturing and converting electromagnetic energy into a usable continuous DC voltage signal.

In the described example, RF harvesting power source 118 includes: an antenna 751 an impedance matching network 752; a rectifier/voltage multiplier 753; and a power storage component 754. The RF harvesting power source 118 is configured to continuously control and harness the RF energy in the environment of the DSD 100 as emitted by an RF source (e.g., as satellite stations, wireless internet, radio stations, and digital multimedia broadcasts). The RF source (not shown) is typically connected to a transmitting antenna that emits radio waves. Antenna 751 is configured as a receiving antenna to capture some of the emitted waves enabling conversion into an electrical signal. In this disclosure, the term "antenna" refers to any RF capturing element implemented within source 118, including, but not limited to, a single element antenna, an antenna array, or an inductive coil.

As shown in FIG. 7b, antenna 751 is implemented as a flat planar coil mounted behind a thin protective layer that does not attenuate RF energy. For example, the antenna 751 may be formed using a multi-coil assembly, with the coil diameter set to the maximum length permitted by the enclosure 116 (i.e., in order to maximize the wavelength). A coil assembly designed for close-proximity wireless charging may be used in some embodiments, such as where the coil is adapted to extract RF energy from different bands if coupled to a low-loss tuning circuit. Antenna 751 may be formed integrally within the material of the enclosure 116 to provide protection against physical wear or damage. In other embodiments, the antenna 751 may be affixed to an outer surface of the enclosure 116 and housed within a separate enclosure (e.g., as a pre-fabricated multi-coil assembly).

The power received by antenna 751 is determined by the distance between the RF source and the RF receiver (i.e., the DSD 100), the sensitivity of the receiver antenna, the characteristics of the receiving antenna, and the frequency of the RF signal. Assuming an unobstructed space and a source of isotropic transmission, the diffusion of waves in all directions is uniform. Therefore, the power per unit area at a distance from the source is inversely proportional to the square of the distance between the antennas. However, the transmitting antenna does not always transmit energy in a spherical wax (isotropic antenna) but may transmit energy in some specific directions according to their design. The capacity and inductance of an antenna are functions of its frequency and physical size. The larger the antenna size, the lower the resonance frequency. Therefore, the there exists a trade-off between facilitating the reception of low-frequency waves (which requires a large aperture), and the design of a physically compact antenna 751 that is suitable for incorporation within the enclosure 116. The bandwidth of an antenna is the frequency range in which the antenna can work efficiently. Narrow-band antennas offer good conversion efficiency but can only recover a limited amount of energy.

In general, power transmission and reception in free space is regulated by:

$$P_r = \frac{P_T G_t G_r}{(4\pi R)^2} \lambda^2$$

where $P_r$ and $P_T$ are the power in reception and transmission, $G_r$ and $G_t$ are the gains of the two antennas, $\lambda$ the wavelength of the RF emission, and R the distance between the two antennas.

As shown in FIG. 7b, an impedance matching circuit 752 is applied between the antenna 751 and the rectifier 753. Since the RF energy extracted from the free space usually has a low power density, the impedance matching network (IMN) 572 is used to maximize the power transfer between the RF source and the load (i.e., to assist in producing enough DC energy from the electromagnetic waves to supply the loads).

The signal generated by the IMN 752 is rectified by the rectifier 753 to meet the application power requirements of the device 100. That is, the rectifier 753 functions as a voltage multiplier circuit that converts and amplifies the AC input (i.e., as produced by the IMN 752) to the DC output. DC output signal is supplied to power storage module 754, implemented as an internal battery, as described above. In some embodiments, the RF harvesting source 118 may omit the internal battery 754 and supply power output from the voltage multiplier 753 directly to the data state indicator 150 and access controller 110 components.

The performance of the RF harvesting source 118 to power at least the indicator 140 of device 100 may be represented by the efficiency of conversion of RF energy into DC (PCE) by the source (i.e., the ratio between the amount of power output from rectifier 753 and that recovered by the antenna 751). In some embodiments, the aforementioned components of the RF harvesting source 118 may be implemented according to a custom fabrication and configuration process especially designed for a particular device 100. In other embodiments, the RF harvesting source 118 can be implemented as a pre-fabricated electronic circuit, such as for example, the Nano-Power band LTC3588-1 circuit by Analog, which provides a selectable output voltage from 1.8 V up to 3.6 V and output current up to 100 mA.

The selection and/or configuration of a pre-fabricated RF harvesting circuit can impact upon the power generation properties of the source 118 in particular environments of the DSD 100. For example, some types of RF harvesting circuits may be configured to function optimally in areas where the RF transmission occurs at 2.4 GHz. As this type of signal is primary produced by WiFi transmission, the power generated by the source 118 may be reduced in environments where such WiFi transmitters are infrequently encountered and/or sparsely located (e.g., in rural areas).

Referring back to FIG. 1a, in some embodiments the DSD 100 may receive power through the data port 106 (i.e., as provided by the host computer 130) and also from ambient power source 118 simultaneously. In response to both the power source 118 and the data port 106 providing an active power source, the device 100 is configured to preferentially power particular device components from a single source. For example, power supplied to the persistent display 142 of indicator 140 may be obtained preferentially from the host computer 130 via the data port 106 over the independent power source 118. In this case, the power that would otherwise be supplied by source 118 is used to charge internal battery 714. This is advantageous in that it enables the independent source 118 to provide a more consistent power supply when power is no longer available from data port 106, and in response to a temporary inability of the source 118 to generate new power (i.e., if there is no solar radiation incident on the device 100, or no RF energy to harvest in the vicinity of the device 100).

In response to the ceasing of power supplied through the data port 106, the device 100 is configured obtain power from the ambient power source 118 to power the data state indicator 140. In some embodiments, even without the supply of power from the data path 104 the access controller 110 receives power from the power source 118 (directly, or indirectly via battery 113) to enable the controller 110 to perform particular functions.

For example, the access controller 110 may secure access to the user content data 109 automatically on the disconnection of power from the host computer 130. That is, the access controller 110 interprets the loss of power from host 130 as a logical disconnection of the host device 130 from device 100, and generates a lock event to automatically lock the DSD 100, such that a corresponding unlock event is required to regain access to the data 109 (i.e., when the host 130 is reconnected to port 106).

In response to the generation of the lock event, the controller 110 automatically changes the change the data access state from the unlocked state to the locked state, and generates the indicator control signals to cause the data state indicator 140 to represent the DA state change according to the methods described above. Since the data state indicator 140 obtains power from the independent source 118, the device 100 persistently indicates the locked state without power from the host computer 130.

In the embodiments described above, the data access state indicator 140 indicates the data access state of the device 100 to a user 101 via persistent display components 142 that retain particular visual representations in the absence of power from data port 106 (e.g., color changing surfaces 142a and bistable displays 142d). However, the ambient power source 118 enables the device 100 to indicate the data access state using other types of data access state indicator 140. For example, in some implementations the data access state indicator 140 may include one or more LEDs, or other active light sources, configured to receive power from at least the ambient source 118. In response to the supply of power from the ambient source 118, the LEDs function to provide a persistent visual indication of the data access state without power from data port 106.

In other embodiments, the data access state indicator 140 may include non-visual indication components in conjunction with one or more visual indication components. The use of non-visual indication components in the indicator 140 may be advantageous in improving device usability by conveying an indication of the data access state in cases where the user cannot obtain the data access state information from a visual representation (e.g., for a user that is visually impaired).

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

The invention claimed is:

1. A data storage device comprising:
   a non-volatile storage medium configured to store user data;
   a data port configured to transmit data and power between a host computer system and the data storage device;
   a data access state indicator comprising one or more persistent display components configured to:

display a visual representation of a data access state; and retain the visual representation in the absence of power; and a controller configured to:
selectively set the data access state of the data storage device to either:
an unlocked state to enable access to the user data; or
a locked state to disable access to the user data; and
generate an indicator control signal to cause the data access state indicator to indicate the data access state, wherein the data access state indicator is configured to indicate the data access state irrespective of whether the data storage device is powered through the data port.

2. The data storage device of to claim 1, wherein the one or more persistent display components is further configured to:
change the visual representation of the data access state responsive to receiving the indicator control signal; and
retain the visual representation of the data access state in the absence of the indicator control signal.

3. The data storage device of claim 1, wherein the one or more persistent display components includes a color changing surface having an electrochromic material configured to change color in response to a voltage applied to the electrochromic material to indicate the data access state of the data storage device.

4. The data storage device of claim 3, wherein, in the locked state;
no voltage is applied to the electrochromic material; and
the corresponding color of the color changing surface indicates a locked state.

5. The data storage device of claim 3, wherein:
the generation of the indicator control signal by the controller comprises:
determining the data access state of the data storage device;
determining an access color corresponding to the data access state based on a mapping of:
the unlocked state to a first color; and
the locked state to a second color; and
determining a voltage to apply to the electrochromic material to change the color of the color changing surface to the access color; and
the color changing surface retains the access color after cessation of the application of the voltage.

6. The data storage device of claim 5, further comprising an indicator control circuit, wherein the data storage device is further configured to transmit the generated indicator control signal to the indicator control circuit to cause the indicator control circuit to:
apply the determined voltage to the electrochromic material to change the color changing surface to the access color; and
cease application of the voltage to the electrochromic material after change of the color of the color changing surface to the access color.

7. The data storage device of claim 1, wherein:
the one or more persistent display components comprises a bi-stable display panel configured to display an electronic label on a substrate in response to a voltage applied to one or more regions of the substrate; and
the electronic label indicates the data access state of the data storage device.

8. The data storage device of claim 7, wherein:
the generation of the indicator control signal by the controller comprises:
determining the data access state of the data storage device;
determining an access label corresponding to the data access state based on a mapping of:
the unlocked state to a first label; and
the locked state to a second label; and
determining a set of voltages to apply to corresponding regions of the substrate of the bi-stable display panel to change the electronic label of the bi-stable display panel to the access label; and
wherein the bi-stable display panel is further configured to retain the access label after the bi-stable display panel is unpowered.

9. The data storage device of claim 8, further comprising an indicator control circuit, wherein the controller is further configured to transmit the generated indicator control signal to the indicator control circuit to cause the indicator control circuit to:
apply the determined set of voltages to the regions of the substrate of the bi-stable display panel to change the electronic label of the bi-stable display panel to the access label; and
cease application of the set of voltages after change of the electronic label on the bi-stable display panel.

10. The data storage device of claim 1, wherein:
the one or more persistent display components comprises a display panel comprising:
an underlying layer having a specified static label indicating the data access state of the data storage device; and
a display surface layer covering the underlying layer; and
the display surface layer has an optical transparency that varies in response to an applied voltage.

11. The data storage device of claim 10, wherein:
the generation of the indicator control signal by the controller comprises:
determining the data access state of the data storage device; and
determining, based on the determined data access state, a voltage to apply to the display surface layer to change the transparency of the display surface layer to reveal or hide the specified static label of the underlying layer; and
the static label of the underlying layer remains revealed or hidden after the display panel is unpowered.

12. The data storage device of claim 1, wherein the one or more persistent display components is configured to obtain power from at least one of:
the host computer system via the data port; and
an independent power source associated with the data storage device.

13. The data storage device of claim 12, wherein the power supplied to the one or more persistent display components is obtained preferentially from the host computer system via the data port over the independent power source.

14. The data storage device of claim 12, wherein the independent power source is an ambient power source configured to generate power from an environment around the data storage device.

15. The data storage device of claim 14, wherein the ambient power source comprises:
at least one of:
one or more solar cells coupled to the data storage device and configured to generate a charge in response to incident solar radiation; and one or more radio-frequency (RF) harvesting components configured to generate a charge in response to contact of the RF harvesting components with electromagnetic radiation; and a battery electrically connected to the at least one of the one or more solar cells and the one or more RF harvesting components to store generated charge.

16. The data storage device of claim 12, wherein, in response to disconnection of power from the host computer system, the data storage device is further configured to:

automatically change the data access state from the unlocked state to the locked state; and persistently indicate the locked state without power from the host computer.

17. The data storage device of claim 1, wherein the controller is further configured to generate a physical enable signal to:

in response to selectively setting the data access state to the unlocked state, enable transmission of user data between the host computer system and the non-volatile storage medium via the data port; and in response to selectively setting the data access state to the locked state, disable transmission of user data between the host computer system and the non-volatile storage medium via the data port.

18. The data storage device of claim 1, further comprising a cryptography engine connected between the data port and the non-volatile storage medium, wherein the controller is further configured to, in response to selectively setting the data access state to the unlocked state, instruct the cryptography engine to use a decryption key to perform a decryption function to selectively decrypt encrypted user data stored on the non-volatile storage medium.

19. A data storage device comprising:

a non-volatile storage medium configured for storing user data;

means for transmitting data and power between a host computer system and the data storage device;

means for indicating a data state, wherein the means for indicating the data state comprises a persistent display component configured to:

display a visual representation of a data access state; and retain the visual representation in the absence of power;

means for selectively setting the data access state of the data storage device as:

an unlocked state to enable access to user data stored on the non-volatile storage medium of the data storage device; or a locked state to disable access to the user data; and means for generating an indicator control signal to cause the means for indicating the data state to indicate the data access state, wherein the means for indicating the data state is configured to indicate the data access state irrespective of whether the data storage device is powered through the means for transmitting data and power.

20. A method for indicating a data access state of a data storage device, the method executed by a controller of the data storage device and comprising:

selectively setting a data access state of the data storage device as:

an unlocked state to enable access to user data stored on a non-volatile storage medium of the data storage device; or a locked state to disable access to the user data; and generating an indicator control signal to cause a data state indicator of the data storage device to indicate the data access state, wherein the data state indicator:

comprises a persistent display component configured to:

display a visual representation of a data access state; and retain the visual representation in the absence of power; and indicates the data access state irrespective of whether the data storage device is powered through a data port configured to transmit data and power between a host computer system and the data storage device.

* * * * *